United States Patent
Hasegawa

(10) Patent No.: US 9,380,200 B2
(45) Date of Patent: Jun. 28, 2016

(54) IMAGE PICKUP APPARATUS AND CONTROL METHOD IN WHICH OBJECT SEARCHING BASED ON AN IMAGE DEPENDS ON PIXEL COMBINING ON THE IMAGE

(75) Inventor: Reiji Hasegawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/478,308

(22) Filed: May 23, 2012

(65) Prior Publication Data

US 2012/0307098 A1    Dec. 6, 2012

(30) Foreign Application Priority Data

May 31, 2011    (JP) .................................. 2011-122786

(51) Int. Cl.
| | |
|---|---|
| H04N 5/232 | (2006.01) |
| H04N 5/235 | (2006.01) |
| H04N 5/347 | (2011.01) |
| H04N 5/369 | (2011.01) |

(52) U.S. Cl.
CPC ........... *H04N 5/23209* (2013.01); *H04N 5/235* (2013.01); *H04N 5/23212* (2013.01); *H04N 5/347* (2013.01); *H04N 5/3696* (2013.01)

(58) Field of Classification Search
None
See application file for complete search history.

(56) References Cited

U.S. PATENT DOCUMENTS

| | | | | |
|---|---|---|---|---|
| 7,787,025 | B2* | 8/2010 | Sanno et al. | 348/231.3 |
| 2007/0242147 | A1* | 10/2007 | Kawai | 348/272 |
| 2009/0009606 | A1* | 1/2009 | Takeuchi | 348/169 |
| 2009/0028394 | A1* | 1/2009 | Hosoi et al. | 382/118 |

FOREIGN PATENT DOCUMENTS

| | | |
|---|---|---|
| CN | 1893562 A | 1/2007 |
| CN | 1928887 A | 3/2007 |
| CN | 101378487 A | 3/2009 |
| JP | 2006-217355 | 8/2006 |
| JP | 2006-217355 A | 8/2006 |
| JP | 2007-057704 A | 3/2007 |

(Continued)

OTHER PUBLICATIONS

Mar. 17, 2015 Japanese Office Action that issued in Japanese Patent Application No. 2011-122786.

(Continued)

*Primary Examiner* — Roberto Velez
*Assistant Examiner* — Quan Pham
(74) *Attorney, Agent, or Firm* — Cowan, Liebowitz & Latman, P.C.

(57) ABSTRACT

Image pickup apparatus 201 generates the optical image formed with light from the image pickup optical system and the second image is generated by using the output from taking picture system 303 and the 2nd image-pickup element with which the first for display and record image is generated by using the output from the 1st image-pickup element 211 that converts the photoelectron respectively and the 2nd image-pickup element 208 and the 1st image-pickup element. Detection system 303 that searches for photometry and the object by using the second image is possessed. The detection system searches for the object when it can be selected whether to add the pixel of the output from the second image-pickup element in photometry, and doesn't add the pixel, and limits the object searching when the pixel is added.

20 Claims, 6 Drawing Sheets

(56) References Cited

FOREIGN PATENT DOCUMENTS

| | | | | |
|---|---|---|---|---|
| JP | 2008109485 | A | * | 5/2008 |
| JP | 2010-170001 | A | | 8/2010 |

OTHER PUBLICATIONS

Dec. 31, 2014 Chinese Office Action that issued in Chinese Patent Application No. 201210177658.0.

* cited by examiner

IMAGE PICKUP APPARATUS AND CONTROL METHOD IN WHICH OBJECT SEARCHING BASED ON AN IMAGE DEPENDS ON PIXEL COMBINING ON THE IMAGE

BACKGROUND OF THE INVENTION

1. Field of the Invention

The present invention relates to an image pickup apparatus such as a single-lens reflex digital camera, and particularly to an image pickup apparatus having a function of detecting an object in a produced image.

2. Description of the Related Art

Image pickup apparatuses including the above-mentioned one are provided with an image capturing system configured to produce a displaying/recording image by using output from a main image sensor that photoelectrically converts an object image to be captured which is an optical image formed by light from an image taking optical system. Moreover, some of such image pickup apparatuses are provided with a detection system configured to produce a photometric image by using output from a sub image sensor that photoelectrically converts a photometric object image which is formed by the light from the image taking optical system. The apparatuses acquire object luminance information from the photometric image.

Single-lens reflex digital cameras have a mirror movable into and out from an optical path from an image taking optical system to switch its state between a state where light from the image taking optical system is introduced to the detection system and a state where the light therefrom is introduced to the image capturing system.

The image pickup apparatuses having such a detection system can use, as the sub image sensor, an image sensor enabling production of a photometric image having a certain level of resolution enabling object recognition. Using such a photometric image makes it possible to perform not only photometry, but also (a) searching for (tracking of) a specific object, such as a person's face, whose position and luminance vary and (b) controls such as automatic proper exposure setting and automatic maintenance of an in-focus state of the image taking optical system.

However, increase of the resolution (pixel number) of the sub image sensor narrows a dynamic range of its each pixel, which may make it impossible to perform good photometry with respect to objects with various luminances. Therefore, in order to expand the dynamic range particularly on a low luminance side, so-called pixel binning is proposed which adds output values of plural pixels and treats its result as an output value of one pixel. Japanese Patent Laid-Open No. 2006-217355 discloses an image pickup apparatus that selects whether or not to perform such pixel binning according to moving speed and luminance (light intensity) of an object.

However, the pixel binning decreases the resolution of the photometric image produced with the sub image sensor, which may decrease accuracy of the object searching using this photometric image and thereby may cause the image pickup apparatus to perform the above-mentioned controls for an incorrect object. Thus, an over-exposure image, an under-exposure image or an out-of-focus image may be produced as the displaying/recording image.

SUMMARY OF THE INVENTION

The present invention provides an image pickup apparatus and a control method therefor enabling, when performing the photometry and the object searching with the sub image sensor, expansion of the dynamic range for the photometry and maintenance of accuracy of the object searching.

The present invention provides as one aspect thereof an image pickup apparatus including a first image sensor and a second image sensor each configured to photoelectrically convert an optical image formed by light from an image taking optical system, an image capturing system configured to produce a first image for display and record by using output from the first image sensor, and a detection system configured to produce a second image by using output from the second image sensor and configured to perform photometry and object searching by using the second image. The detection system is configured to allow selection of whether or not to perform pixel binning on the output from the second image sensor in the photometry. The detection system is configured to perform the object searching when not performing the pixel binning and restrict the object searching when performing the pixel binning.

The present invention provides as another aspect thereof an image pickup apparatus including a first image sensor and a second image sensor each configured to photoelectrically convert an optical image formed by light from an image taking optical system, an image capturing system configured to produce a first image for display and record by using output from the first image sensor, and a detection system configured to produce a second image by using output from the second image sensor and configured to perform photometry and object searching by using the second image. The detection system is configured to allow selection of whether or not to perform pixel binning on the output from the second image sensor in the photometry. The detection system is configured to permit use of a result of the object searching when not performing the pixel binning and restrict the use of the result of the object searching when performing the pixel binning.

The present invention provides as still another aspect thereof a control method for an image pickup apparatus including a first image sensor and a second image sensor each configured to photoelectrically convert an optical image formed by light from an image taking optical system, an image capturing system configured to produce a first image for display and record by using output from the first image sensor, and a detection system configured to produce a second image by using output from the second image sensor and configured to perform photometry and object searching by using the second image. The method includes a step of selecting whether or not to perform pixel binning on the output from the second image sensor in the photometry, a step of performing the object searching when not performing the pixel binning, and a step of restricting the object searching when performing the pixel binning.

The present invention provides as yet still another aspect thereof a control method for an image pickup apparatus including a first image sensor and a second image sensor each configured to photoelectrically convert an optical image formed by light from an image taking optical system, an image capturing system configured to produce a first image for display and record by using output from the first image sensor, and a detection system configured to produce a second image by using output from the second image sensor and configured to perform photometry and object searching by using the second image. The method includes a step of selecting whether or not to perform pixel binning on the output from the second image sensor in the photometry, a step of permitting use of a result of the object searching when not performing the pixel binning, and a step of restricting the use of the result of the object searching when performing the pixel binning.

Further features of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Figure 1:
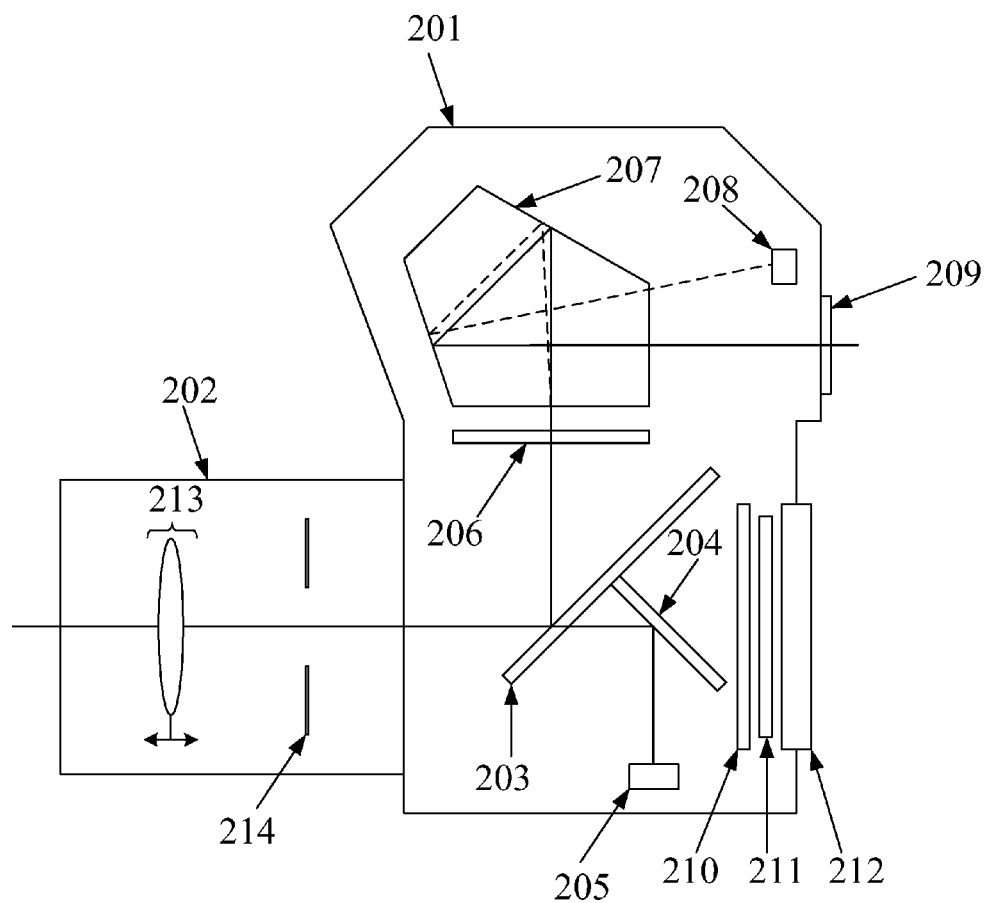
FIG. 1 is a cross-sectional view showing an optical configuration of an image pickup apparatus that is an embodiment of the present invention.

FIG. 1 mainly shows an optical configuration of a camera system constituted by a single-lens reflex digital camera main body (hereinafter simply referred to as "a camera") 201 and an interchangeable lens 202 detachably attachable (that is, interchangeable) to the camera 201. The camera 201 and the interchangeable lens 202 are electrically connected with each other via mount contacts (not shown).

The interchangeable lens 202 houses thereinside an image taking optical system constituted by lenses (not shown) such as a magnification-varying lens and a fixed lens, a focus lens 213 and an aperture stop 214. The image taking optical system causes light from an object (not shown) to form an object image that is an optical image. The interchangeable lens 202 moves the focus lens 213 for focusing and changes an aperture diameter of the aperture stop 214 for controlling an amount of light taken into the camera 201, according to control signals sent from the camera 201 through the mount contacts.

In the camera 201, reference numeral 203 denotes a main mirror constituted by a half mirror. The main mirror 203 is disposed inside an optical path from the image taking optical system (this state is hereinafter referred to as "a mirror down state") in an optical viewfinder observation state to reflect part of the light from the image taking optical system toward a viewfinder optical system. Light transmitted through the main mirror 203 is introduced, via reflection on a sub mirror 204 disposed at back of the main mirror 203, to an AF unit (focus detection unit) 205.

On the other hand, in an image capturing state, the main mirror 203 and the sub mirror 204 are retracted outside the optical path from the image taking optical system (this state is hereinafter referred to as "a mirror up state"). In this mirror up state, the light from the image taking optical system proceeds toward a shutter 210 and an image sensor 211 for image capturing which is a first image sensor and hereinafter referred to as "a main image sensor". In the mirror up state, opening the shutter 210 allows exposure of the main image sensor 211 with the light from the image taking optical system. The main image sensor 211 photoelectrically converts the object image formed on its image pickup surface.

A displaying/recording image data as a first image (hereinafter referred to as "a main image") is produced by using an output signal from the main image sensor 211. The main image is displayed as an electronic viewfinder image on a monitor 212 provided on a rear face of the camera 201 and is recorded to a storage medium (not shown).

Figure 3:
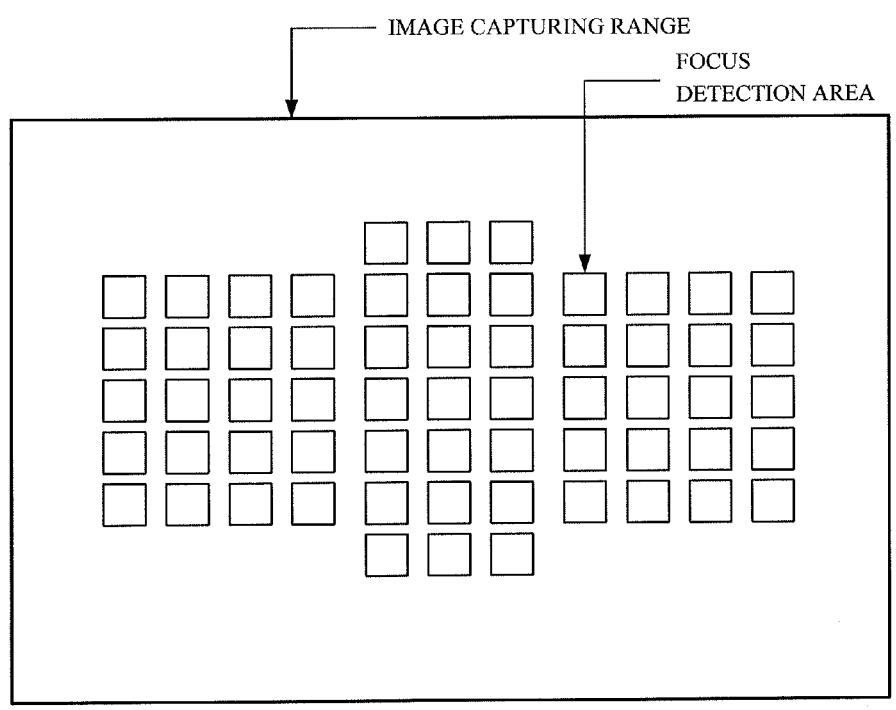
FIG. 3 shows arrangement of focus detection areas in the image pickup apparatus of the embodiment.

The AF sensor 205 is provided with plural sensor groups each including a secondary image-forming optical system that causes the light from the sub mirror 204 to form paired object images (hereinafter referred to as "two images") and paired light-receiving elements (line sensors) that photoelectrically convert the two images, the plural sensor groups respectively corresponding to plural focus detection areas provided in an image capturing frame. FIG. 3 shows arrangement of the plural focus detection areas in the image capturing frame (image capturing range). Calculating a phase difference between paired image signals output from the paired line sensors enables detection of a focus state (defocus amount) of the image taking optical system. Then, moving the focus lens 213 to an in-focus position calculated based on the defocus amount enables acquisition of an in-focus state of the image taking optical system. Thus, autofocus (AF) by a phase difference detection method, which includes the focus state detection, the in-focus position calculation and the focus lens drive, can be performed.

In FIG. 1, reference numeral 206 denotes a focusing plate disposed at a target image-forming plane of the image taking optical system. The object image is formed on the focusing plate 206 by the light reflected by the main mirror 203. Reference numeral 207 denotes a penta prism that reflects the light from the focusing plate 206 to change its optical path. The focusing plate 206, the penta prism 207 and an eyepiece lens (not shown) constitute the viewfinder optical system. Reference numeral 209 denotes an eyepiece frame through which a user can observe the object image formed on the focusing plate 206 through the eyepiece lens and the penta prism 207.

Reference numeral 208 denotes an AE sensor provided with an image sensor for photometry which is a second image sensor and hereinafter referred to as "a sub image sensor". The sub image sensor photoelectrically converts the light entering thereinto from the object image formed on the focusing plate 206 through the penta prism 207 (that is, photoelectrically converts the object image). Object luminance can be detected from image data produced by using an output signal from the sub image sensor; the image data is a second image and hereinafter referred to as "a sub image".

The sub image sensor has an image pickup surface whose size is capable of photoelectrically converting the object image included in the entire image capturing range shown in FIG. 3. The image pickup surface of the sub image sensor is provided with plural pixels (R-pixels, G-pixels and B-pixels) arranged as shown in an upper part of FIG. 6. The R-pixels, the G-pixels and the B-pixels are respectively arranged so as to form R-pixel rows, B-pixel rows and G-pixel rows each extending in a vertical direction. The R-pixel row, the B-pixel row and the G-pixel row are arranged in this order in a repetitive manner in a horizontal direction. Such pixel arrangement is referred to as "stripe arrangement" in this embodiment.

Figure 6:
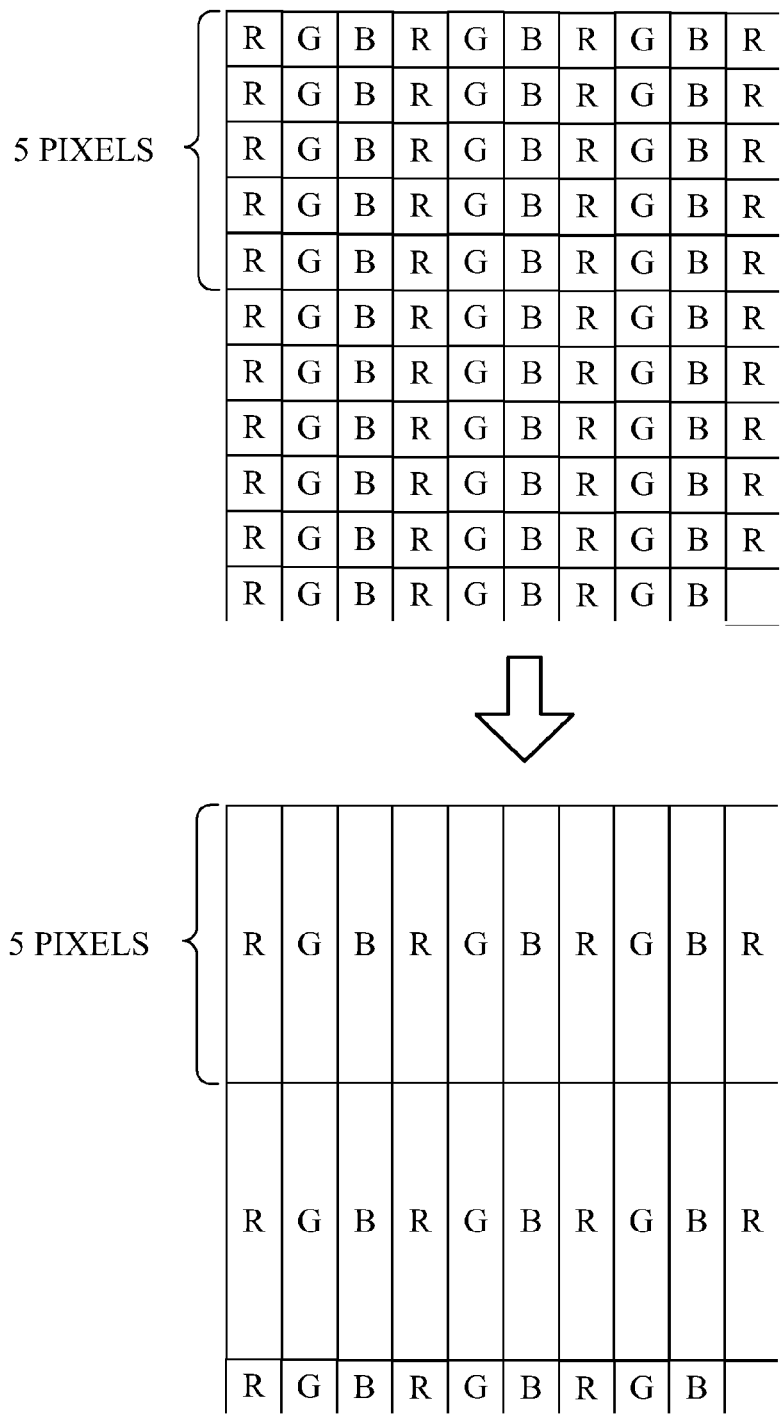
FIG. 6 shows pixel arrangement of an AE sensor in the image pickup apparatus of the embodiment and an example of pixel binning.

In this sub image sensor, as shown in a lower part of FIG. 6, five pixels mutually adjacent in the vertical direction in each of the R-pixel rows, the G-pixel rows and the B-pixel rows constitute one pixel group. Producing such a pixel group is referred to as "pixel binning" in this embodiment which adds output values (pixel values) of the five pixels in the one pixel group to produce one pixel output. The pixel binning decreases vertical resolution of the sub image to ⅕ of that in a case of not performing the pixel binning, but provides a wide dynamic range for the photometry particularly with respect to a low luminance object. This embodiment can select whether or not to perform the pixel binning on the output of (in signal readout from) the sub image sensor.

Moreover, this embodiment performs, by using the sub image whose resolution corresponds to a large number of the R-, G- and B-pixels as shown in the upper part of FIG. 6, object searching (or object detecting). The object searching is a process to detect a specific object such as a person's face existing in the sub image by using an image processing method such as pattern matching. The photometry and the AF can be performed by following luminance or position of the specific object detected by the object searching. Such a process performing the photometry or the AF with tracking of the specific object by using results of the object searching is referred to as "an object tracking process".

In the following description, a series of operations of the camera 201 for acquiring the main image by using the main image sensor 211 is referred to as "main image capturing", and a series of operations thereof for acquiring the sub image by using the sub image sensor (AE sensor 208) is referred to as "sub image capturing".

Figure 2:
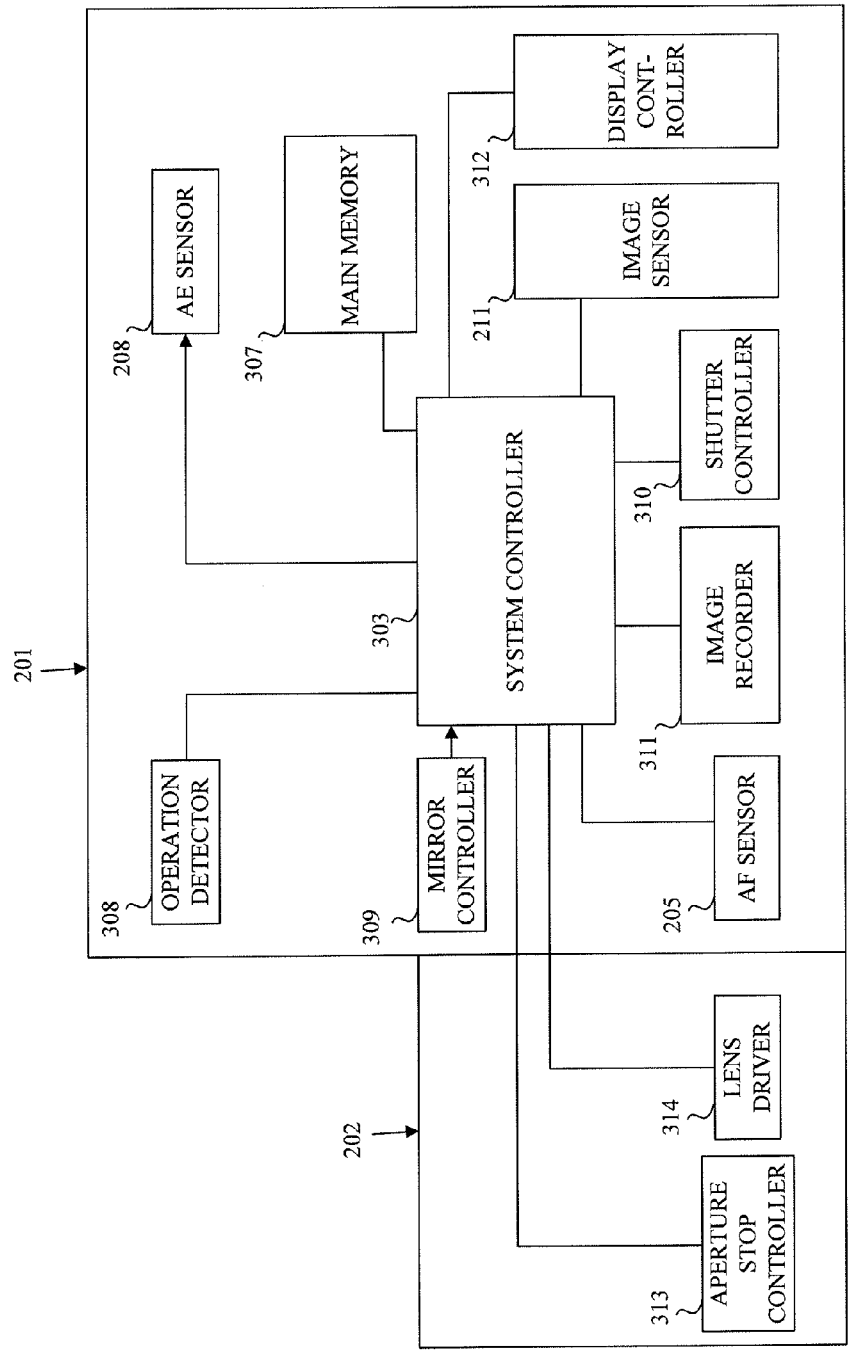
FIG. 2 is a block diagram showing an electrical configuration of the image pickup apparatus of the embodiment.

FIG. 2 shows an electric configuration of the above-described camera system. In FIG. 2, components identical to those shown in FIG. 1 are denoted by same reference numerals as those used in FIG. 1.

In the camera 201, an operation detector 308 detects user's operations of operating members such as buttons, switches and dials to output operation signals in response thereto to a system controller 303. For example, the operation detector 308 outputs, in response to a half-press operation of a release button (not shown), an SW1 signal to the system controller 303, and outputs, in response to a full-press operation of the release button, an SW2 signal to the system controller 303.

In the following description, a state where the user's half-press operation of the release button is held is referred to as "an SW1 hold state", a state where the user's full-press operation of the release button is held is referred to as "an SW2 hold state". Moreover, the operation detector 308 outputs, in response to cancellation of the half-press operation of the release button, an SW1 cancellation signal to the system controller 303, and outputs, in response to cancellation of the full-press operation of the release button, an SW2 cancellation signal to the system controller 303.

A mirror controller 309 controls the above-mentioned movement of the main and sub mirrors 203 and 204 in response to a mirror drive signal from the system controller 303. The system controller 303 reads the paired image signals from the paired line sensors corresponding to each of the focus detection areas in the AF sensor 205 when receiving the SW1 signal from the operation detector 308 and in the mirror down state during continuous image capturing. Then, the system controller 303 selects one (or more) focus detection area where the AF is to be performed, and calculates an in-focus position (focus lens movement amount) in the selected focus detection area. Thereafter, the system controller 303 sends a lens drive signal corresponding to the calculated focus lens movement amount to a lens driver 314 provided in the interchangeable lens 202. The lens driver 314 moves the focus lens 213 based on the lens drive signal so as to acquire an in-focus state.

The system controller 303 performs various image producing processes on the output signal from the main image sensor 211 to produce the main image, and outputs the main image to a display controller 312 and an image recorder 311. The display controller 312 converts the main image into an image proper for display, and displays the converted image on the monitor 212. The image recorder 311 converts the main image into an image proper for record, and records the converted image to a recording medium such as a semiconductor memory or an optical disk. The system controller 303 constitutes, together with the main image sensor 211, an image capturing system.

A main memory 307 stores data necessary for various calculations performed by the system controller 303 and computer programs necessary for various operations of the system controller 303.

Moreover, the system controller 303 performs the various image producing processes on the output signal from the AE sensor 208 (that is, from the sub image sensor) to produce the sub image, and detects the object luminance by using the sub image. The system controller 303 constitutes, together with the AE sensor 208 (that is, together with the sub image sensor), a detection system.

The system controller 303 performs exposure calculation (calculation of an aperture value and a shutter speed) for proper exposure based on the detected object luminance. Then, the system controller 303 outputs an aperture stop drive signal corresponding to the calculated aperture value to an aperture stop controller 313 provided in the interchangeable lens 202, and outputs a shutter drive signal corresponding to the calculated shutter speed to a shutter controller 310 provided in the camera 201. The aperture stop controller 313 drives the aperture stop 214 based on the aperture stop drive signal to change its aperture diameter. The system controller 303 causes, in the main image capturing, the shutter 210 to open and shut at a shutter speed corresponding to the shutter drive signal.

In addition, the system controller 303 performs, in the continuous image capturing, the object searching in the sub image to detect position of the specific object in the sub image. Then, the system controller 303 selects one (or more) focus detection area corresponding to the position of the specific object from the plural focus detection areas shown in FIG. 3. Thereafter, the system controller 303 sends the lens drive signal to the lens driver 314, based on a calculation result of the in-focus position in the selected focus detection area.

Figure 4:
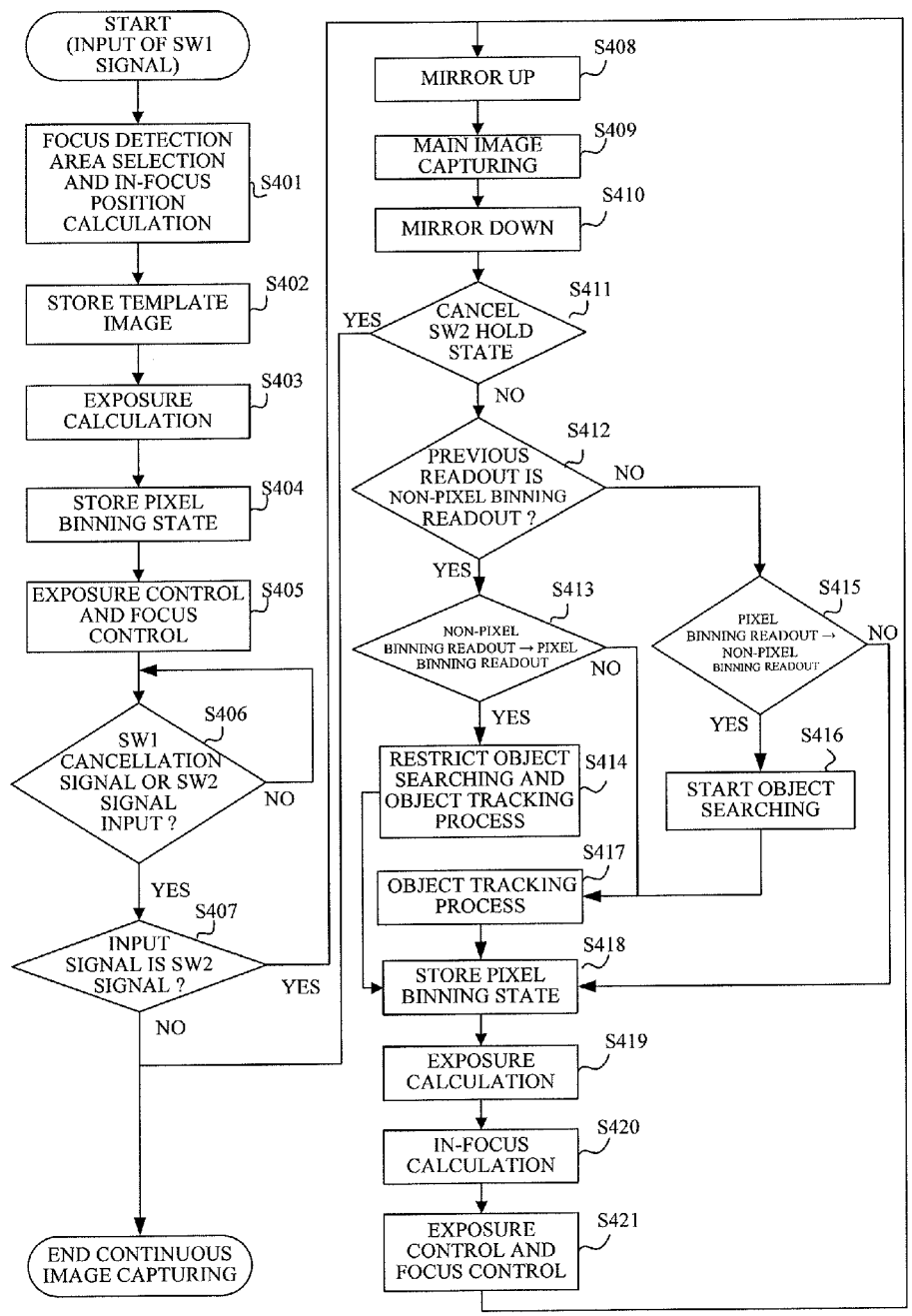
FIG. 4 is a flowchart showing an object tracking process performed in continuous image capturing in the image pickup apparatus of the embodiment.

Next, description will be made of processing (control method) performed by the camera system in the continuous image capturing with reference to a flowchart shown in FIG. 4. This continuous image capturing processing is performed mainly by the system controller 303 according to the computer program stored in the main memory 307. Processes at steps S401 to S405 are performed in the SW1 hold state, which are performed as a continuous image capturing preparation operation. Moreover, subsequent processes from step S406 are performed in the SW2 hold state set according to the full-press operation of the release button, which are performed as a continuous image capturing operation. In the continuous image capturing operation, the object tracking process including the object searching in the sub image.

The system controller 303 starts the processing in response to input of the SW1 signal thereinto from the operation detector 308 according to the user's half-press operation of the release button.

At step S401, the system controller 303 selects one (or more) focus detection area from the plural focus detection areas shown in FIG. 3 according to a user's selection operation detected by the operation detector 308 or through a selection process performed by the computer program. Then, the system controller 303 calculates an in-focus position based on the paired image signals obtained in the selected focus detection area and output from the AF sensor 205.

Next, at step S402, the system controller 303 produces the sub image by using the output signal from the AE sensor 208. Then, the system controller 303 extracts, from the sub image, a partial image in a predetermined region (hereinafter referred to as "an image extraction region") centering on the focus detection area selected at step S401, and then stores the extracted image and center coordinates of the image extraction region to the main memory 307. In the following description, the extracted image stored in the main memory 307 is referred to as "a template image", and the center coordinates of the image extraction region is referred to as "a previous object position". Furthermore, the following description is made on an assumption that the object luminance is sufficiently high and therefore no pixel binning is performed in the sub image sensor at this point.

Next, at step S403, the system controller 303 performs the exposure calculation by using the sub image produced at step S402.

Next, at step S404, the system controller 303 stores, to the main memory 307, information on a pixel binning state of the AE sensor 208; the pixel binning state shows whether or not the pixel binning is performed in the signal readout from the AE sensor 208. The pixel binning is not performed at this point as mentioned above, so that the system controller 303 stores the information showing that the pixel binning is not performed to the main memory 307. The signal readout from the AE sensor 208 with the pixel binning is hereinafter referred to as "pixel binning readout", and the signal readout therefrom without the pixel binning is hereinafter referred to as "non-pixel binning readout".

Next, at step S405, the system controller 303 sends, on the basis of the in-focus position calculation result obtained at step S401 and the exposure calculation result obtained at step S403, the lens drive signal and the aperture stop drive signal to the lens driver 314 and the aperture stop controller 313, respectively. Thus, an in-focus state of the image taking optical system can be obtained, and the aperture diameter of the aperture stop 214 is controlled.

Next, at step S406, the system controller 303 waits for the user's full-press operation of the release button or cancellation of the user's half-press operation. Then, if the SW2 signal or the SW1 cancellation signal is input from the operation detector 308, the system controller 303 proceeds to step S407.

At step S407, the system controller 303 determines whether the signal input at step S406 is the SW1 cancellation signal or the SW2 signal. If the input signal is the SW1 cancellation signal, the system controller 303 ends the continuous image capturing processing. If the input signal is the SW2 signal, the system controller 303 proceeds to step S408 to start the continuous image capturing operation.

At step S408, the system controller 303 outputs the mirror drive signal to the mirror controller 309 to cause it to drive the main and sub mirrors 203 and 204 to the mirror up state.

Next, at step S409, the system controller 303 outputs the shutter drive signal to the shutter controller 310 to cause it to open and shut the shutter 210 so as to expose the main image sensor 211. Then, the system controller 303 produces the main image by using the output signal from the main image sensor 211 to display it on the monitor 212 and to record it to the recording medium in the image recorder 311, as mentioned above.

Next, at step S410, the system controller 303 outputs the mirror drive signal to the mirror controller 309 to cause it to drive the main and sub mirrors 203 and 204 to the mirror down state.

Next, at step S411, the system controller 303 determines whether or not the SW2 hold state has been canceled (that is, whether having received the SW2 cancellation signal or not). If having received the SW2 cancellation signal, the system controller 303 ends the continuous image capturing processing. If not having received the SW2 cancellation signal, the system controller 303 proceeds to step S412.

At step S412, the system controller 303 reads, from the main memory 307, the information on the pixel binning state of the AE sensor 208 (that is, whether the pixel binning readout or the non-pixel binning readout has been performed) in a previous flow. If the non-pixel binning readout has been performed, the system controller 303 proceeds to step S413. If the pixel binning readout has been performed, the system controller 303 proceeds to step S415.

At step S413, the system controller 303 determines, on the basis of the current object luminance (photometry result), whether or not to perform the pixel binning readout from the AE sensor 208 in the current flow, that is, whether or not to switch from the non-pixel binning readout to the pixel binning readout. If to switch from the non-pixel binning readout to the pixel binning readout, the system controller 303 proceeds to step S414. If not to switch from the non-pixel binning readout to the pixel binning readout (that is, without switching), the system controller 303 proceeds to step S417 to continue the object tracking process continuing from the previous flow.

At step S414, the system controller 303 restricts (discontinues in this embodiment) the object searching and the object tracking process because the switching to the pixel binning readout from the AE sensor 208 makes it impossible to perform the object searching in the sub image with good accuracy. Then, the system controller 303 proceeds to step S418.

On the other hand, at step S415, the system controller 303 determines, on the basis of the current object luminance (photometry result), whether or not to perform the non-pixel binning readout from the AE sensor 208 in the current flow, that is, whether or not to switch from the pixel binning readout to the non-pixel binning readout. If to switch from the pixel binning readout to the non-pixel binning readout, the system controller 303 proceeds to step S416. If not to switch from the pixel binning readout to the non-pixel binning readout (that is, without switching), the system controller 303 proceeds to step S418.

At step S416, the system controller 303 starts the object searching because the switching to the non-pixel binning readout from the AE sensor 208 makes it possible to perform the object searching in the sub image with good accuracy. Specifically, the system controller 303 produces the sub image by using the output signal from the AE sensor 208, and reads the template image from the main memory 307. Then, the system controller 303 examines correlation, that is, performs template pattern matching (hereinafter simply referred to as "matching") between these two images to detect, in the sub image, position of an object identical to the specific object included in the template image.

Figure 5:
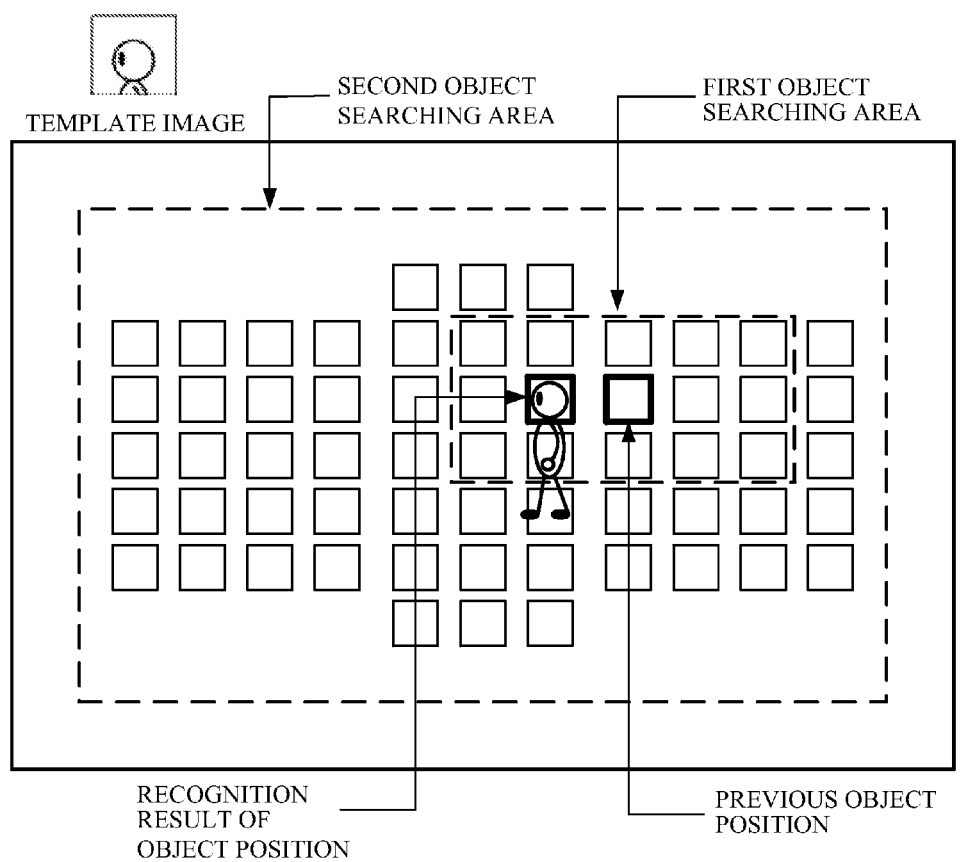
FIG. 5 shows an example of the object tracking process in the image pickup apparatus of the embodiment.

When performing the matching, the system controller 303 first reads the previous object position from the main memory 307. Then, the system controller 303 limits, as a first step, an area for performing the matching in the sub image, as shown in FIG. 5, to a first object searching area that is a narrow area centering on the previous object position. The first object searching area shown in FIG. 5 as an example includes three focus detection areas in the vertical direction and five focus detection areas in the horizontal direction.

When detecting no specific object in the first object searching area, the system controller 303 expands, as a second step, the area for performing the matching in the sub image to a second object searching area that is a wide area almost corresponding to the entire image area of the sub image.

In addition, the system controller 303 performs the matching after reducing resolution of the sub and template images into ½ of their original resolution. Performing the matching within the first object searching area and by using the ½ resolution images makes it possible to perform the matching with high speed, which enables shortening of time required for the object tracking process including subsequent focus lens drive. After thus starting the object searching, the system controller 303 proceeds to step S417 to start the object tracking process. In the following description, the ½ resolution sub image produced from the output signal from the AE sensor 208 at step S416 is referred to as "a first sub image".

Moreover, the system controller 303 extracts, from the sub image, another partial image in another image extraction region centering on the position of the object detected in the sub image as a new template image, and stores the new template image and center coordinates of the other image extraction region to the main memory 307. These stored new template image and the center coordinates of the image extraction region are used for next object searching. Then, the system controller 303 proceeds to step S418.

At step S418, the system controller 303 stores the pixel binning state of the AE sensor 208 in the current flow to the main memory 307.

Next, at step S419, the system controller 303 produces another ½ resolution sub image (hereinafter referred to as "a second sub image") by using the output signal from the AE sensor 208, and adds the second sub image to the first sub image produced at step S416 to produce a new sub image (hereinafter referred to as "a combined sub image). Then, the system controller 303 performs the exposure calculation using the combined sub image, and stores its result. Performing the exposure calculation using the combined sub image enables reduction of noise and increase of pixel values as compared with a case of performing the exposure calculation using the first sub image, which enables stable exposure calculation.

Next, at step S420, the system controller 303 performs, if it is during the object tracking process, the focus detection and the in-focus position calculation in the focus detection area corresponding to the position of the specific object (actually, the object identical to the specific object in the template image) detected in the sub image. The system controller 303 performs, if it is not during the object tracking process, the focus state detection and the in-focus position calculation in the focus detection area selected at step S401.

Next, at step S421, the system controller 303 sends the lens drive signal and the aperture stop drive signal to the lens driver 314 and the aperture stop controller 313, respectively, based on the in-focus position calculation result obtained at step S420 and the exposure calculation result obtained at step S419. Thereby, the image taking optical system becomes in-focus, and the aperture diameter of the aperture stop 214 is controlled. Thereafter, the system controller 303 returns to step S408.

As described above, this embodiment performs the pixel binning in the signal readout from the sub image sensor, which enables good photometry with an expanded dynamic range. On the other hand, this embodiment does not perform the pixel binning in the signal readout from the sub image sensor so as to produce the sub image with sufficient resolution, which enables the object searching with high accuracy in the sub image and thereby enables good object tracking process.

Moreover, this embodiment automatically discontinues (or suspends) the object searching in response to selection of the pixel binning (switching to the pixel binning readout) in the state of performing the object searching, and automatically restarts the object searching in response to returning (switching) to the pixel binning readout. Therefore, this embodiment can perform automatic switching between the good photometry and the highly accurate object searching, without user's burden such as a switching operation.

Although the above embodiment described the case of using, as the template image for performing the object searching by the template pattern matching in the sub image, only one image stored initially, an alternative embodiment may use another template image produced by clipping a partial image including the specific object from a newly produced image during the continuous image capturing.

Moreover, another alternative embodiment may perform object searching using color information or face detection information, other than the object searching using the template pattern matching described in the above embodiment. In addition, further another alternative embodiment may perform object searching using a moving object analysis utilizing optical flow or object searching using a scene recognition technology utilizing edge detection.

Although the above embodiment described the case of performing the object searching when not performing the pixel binning and of discontinuing (suspending or prohibiting) the object searching when performing the pixel binning, restriction of the object searching when performing the pixel binning may be made by any one of restriction methods including not only the discontinuation, but also permission of the object searching under a specific condition without the discontinuation. For example, the permission of the object searching may be made under a condition that a size of the specific object in the sub image produced by the pixel binning is a size detectable with good accuracy. Moreover, the permission of the object searching may be made under a condition of reducing the template image according to a degree of the pixel binning. In addition, the permission of the object searching may be made under a condition of performing the object searching by a method detecting color of the specific object (color tracking). In this case, the template image may be painted out with the color of the specific object.

Furthermore, when performing the pixel binning, without the restriction (such as the discontinuation) of the object searching, though the object searching may be permitted as well as the case of not performing the pixel binning, restriction of use of its result (prohibition of the use, or permission of only tentative use because of low reliability of the object searching). Processing (control method) by the system controller 303 in this case is basically performed similarly to that shown by the flowchart of FIG. 4. However, step S414 in FIG. 4 is changed from "restrict object searching and object tracking process" to "restrict use of results of object searching and object tracking process".

Also in this case, the use of the result of the object searching can be restricted in response to switching to the pixel binning readout in a state of permitting the use of the result of the object searching, and the use of the result of the object searching can be permitted again in response to returning to the pixel binning readout.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-122786, filed on May 31, 2011, which is hereby incorporated by reference herein in its entirety.

What is claimed is:

1. An image pickup apparatus comprising:
a first image sensor and a second image sensor each configured to photoelectrically convert an optical image formed by light from an image taking optical system;
an image capturing system configured to produce a first image for display and record by using output from the first image sensor;
a detection system configured to produce a second image by using output from the second image sensor and configured to perform photometry and object searching by using the second image; and
a controller configured to determine whether or not to perform pixel combining in the second image sensor for producing the second image, and
wherein the detection system is configured to, when the controller determines that the pixel combining is performed, restrict the object searching using the second image.

2. An image pickup apparatus according to claim 1, wherein the detection system is configured to, in response to selection of performing the pixel combining in a state of performing the object searching, restrict the object searching, and configured to restart the object searching in response to returning to a state of not performing the pixel combining.

3. An image pickup apparatus according to claim 1, the detection system is configured to perform the object searching when not performing the pixel combining.

4. An image pickup apparatus comprising:
a first image sensor and a second image sensor each configured to photoelectrically convert an optical image formed by light from an image taking optical system;
an image capturing system configured to produce a first image for display and record by using output from the first image sensor; and
a detection system configured to produce a second image by using output from the second image sensor and configured to perform photometry and object searching by using the second image,
wherein the detection system is configured to allow determination of whether or not to perform pixel combining in the second image sensor for producing the second image in the photometry, and
wherein the detection system is configured to permit use of a result of the object searching when not performing the pixel combining and restrict the use of the result of the object searching when performing the pixel combining according to the determination.

5. An image pickup apparatus according to claim 4, wherein the detection system is configured to, in response to selection of performing the pixel combining in a state of permitting the use of the result of the object searching, restrict the object searching, and configured to again permit the object searching in response to returning to a state of not performing the pixel combining.

6. A control method for an image pickup apparatus including (a) a first image sensor and a second image sensor each configured to photoelectrically convert an optical image formed by light from an image taking optical system, (b) an image capturing system configured to produce a first image for display and record by using output from the first image sensor, and (c) a detection system configured to produce a second image by using output from the second image sensor and configured to perform photometry and object searching by using the second image, the method comprising the steps of:
determining whether or not to perform pixel combining in the second image sensor for producing the second image;
performing the object searching when not performing the pixel combining; and
restricting the object searching when performing the pixel combining.

7. A control method for an image pickup apparatus including (a) a first image sensor and a second image sensor each configured to photoelectrically convert an optical image formed by light from an image taking optical system, (b) an image capturing system configured to produce a first image for display and record by using output from the first image sensor, and (c) a detection system configured to produce a second image by using output from the second image sensor and configured to perform photometry and object searching by using the second image, the method comprising the steps of:
determining whether or not to perform pixel combining in the second image sensor for producing the second image in the photometry;
permitting use of a result of the object searching when not performing the pixel combining; and
restricting the use of the result of the object searching when performing the pixel combining.

8. An image pickup apparatus comprising:
a first image sensor and a second image sensor each configured to photoelectrically convert an optical image formed by light from an image taking optical system;
a system controller configured to:
produce a first image for display and record by using output from the first image sensor;
produce a second image by using output from the second image sensor and perform photometry and object searching by using the second image; and
determine whether or not to perform pixel combining in the second image sensor for producing the second image, and
wherein when the system controller determines that the pixel combining is performed, the system controller restricts the object searching using the second image.

9. An image pickup apparatus according to claim 8, wherein the system controller is configured to, in response to selection of performing the pixel combining in a state of performing the object searching, restrict the object searching, and configured to restart the object searching in response to returning to a state of not performing the pixel combining.

10. An image pickup apparatus according to claim 8, the system controller is configured to perform the object searching when not performing the pixel combining.

11. An image pickup apparatus comprising:
a first image sensor and a second image sensor each configured to photoelectrically convert an optical image formed by light from an image taking optical system;
a system controller configured to:
produce a first image for display and record by using output from the first image sensor; and
produce a second image by using output from the second image sensor and perform photometry and object searching by using the second image, wherein the system controller is configured to allow determination of whether or not to perform pixel combining in the second image sensor for producing the second image in the photometry, and wherein the system controller is configured to permit use of a result of the object searching when not performing the pixel combining and restrict the use of the result of the object searching when performing the pixel combining according to the determination.

12. An image pickup apparatus according to claim 11, wherein the system controller is configured to, in response to selection of performing the pixel combining in a state of permitting the use of the result of the object searching, restrict the object searching, and configured to again permit the object searching in response to returning to a state of not performing the pixel combining.

13. A control method for an image pickup apparatus including (a) a first image sensor and a second image sensor each configured to photoelectrically convert an optical image formed by light from an image taking optical system, and (b) a system controller configured to: produce a first image for display and record by using output from the first image sensor, and produce a second image by using output from the second image sensor and configured to perform photometry and object searching by using the second image, the method comprising the steps of:

determining whether or not to perform pixel combining in the second image sensor for producing the second image;

performing the object searching when not performing the pixel combining; and restricting the object searching when performing the pixel combining.

14. A control method for an image pickup apparatus including (a) a first image sensor and a second image sensor each configured to photoelectrically convert an optical image formed by light from an image taking optical system, and (c) a system controller configured to: produce a first image for display and record by using output from the first image sensor, and produce a second image by using output from the second image sensor and configured to perform photometry and object searching by using the second image, the method comprising the steps of:

determining whether or not to perform pixel combining in the second image sensor for producing the second image in the photometry;

permitting use of a result of the object searching when not performing the pixel combining; and restricting the use of the result of the object searching when performing that the pixel combining.

15. An image pickup apparatus comprising:

a first image sensor and a second image sensor each configured to photoelectrically convert an optical image formed by light from an image taking optical system;

a system controller configured to:

produce a first image for display and record by using output from the first image sensor;

produce a second image by using output from the second image sensor and perform photometry and object searching by using the second image; and wherein when the system controller determines that the second image is produced through pixel combining, the system controller restricts the object searching using the second image.

16. An image pickup apparatus according to claim 15, wherein the system controller is configured to, in response to selection of performing the pixel combining in a state of performing the object searching, restrict the object searching, and configured to restart the object searching in response to returning to a state of not performing the pixel combining.

17. An image pickup apparatus according to claim 15, the system controller is configured to perform the object searching when the second image is produced through the pixel combining.

18. An image pickup apparatus comprising:

a first image sensor and a second image sensor each configured to photoelectrically convert an optical image formed by light from an image taking optical system;

a system controller configured to:

produce a first image for display and record by using output from the first image sensor; and produce a second image by using output from the second image sensor and perform photometry and object searching by using the second image, and wherein the system controller is configured to restrict the use of the result of the object searching when the second image is produced through pixel combining.

19. An image pickup apparatus according to claim 18, wherein the system controller is configured to, in response to selection of performing the pixel combining in a state of performing mitting the use of the result of the object searching, restrict the object searching, and configured to again permit the object searching in response to returning to a state of not performing the pixel combining.

20. An image pickup apparatus according to claim 18, wherein the system controller is configured to permit use of a result of the object searching when the second image is produced through the pixel combining.

* * * * *